No. 745,661. PATENTED DEC. 1, 1903.
T. O. POTTER.
LAVATORY APPARATUS.
APPLICATION FILED DEC. 6, 1901.

NO MODEL.

WITNESSES
C. B. Maynadier
G. A. Rockwell.

INVENTOR
Thomas O. Potter
by J. E. Maynadier
his Attorney

No. 745,661. Patented December 1, 1903.

UNITED STATES PATENT OFFICE.

THOMAS O. POTTER, OF SOMERVILLE, MASSACHUSETTS.

LAVATORY APPARATUS.

SPECIFICATION forming part of Letters Patent No. 745,661, dated December 1, 1903.

Application filed December 6, 1901. Serial No. 84,922. (No model.)

*To all whom it may concern:*

Be it known that I, THOMAS O. POTTER, of Somerville, in the county of Middlesex and State of Massachusetts, have invented a new and useful Lavatory Apparatus, of which the following is a specification, reference being had to the accompanying drawings, making a part hereof.

My apparatus is more especially intended for use in what are known as "day" and "night" cars, but is of course capable of use in all cases where the apparatus requires to be out of the way when not in use; and my invention consists in a washbowl supported by hollow hinged rods, with a fixed supply-pipe conducting water to one of the hinged rods and a fixed waste-pipe to conduct water from the other hinged rod, which rod projects horizontally from the rearmost part of the bowl when the bowl is ready for use and vertically from the lowermost part of the bowl when turned back.

Figure 1:
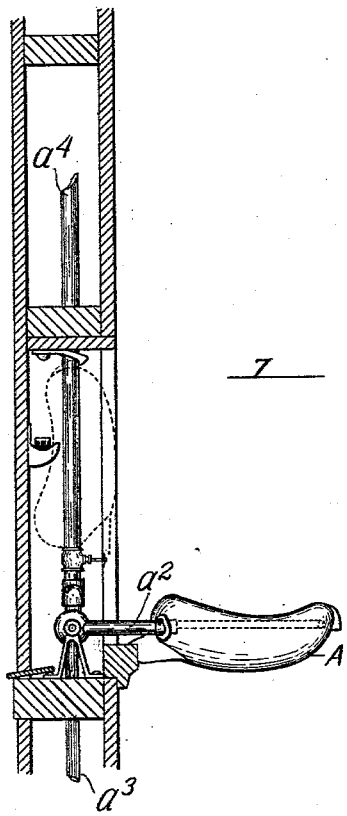
Figure 2:
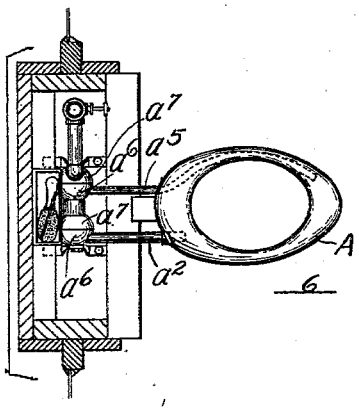

In the drawings, Figure 1 is a sectional elevation of my apparatus, and Fig. 2 is a sectional plan.

Bowl A is connected with and supported by the movable waste-pipe $a^2$ and the movable supply-pipe $a^5$, and these pipes are fast each to its half $a^6$ of a hollow sphere, the other half, $a^7$, of each hollow sphere being connected one with the fixed waste-pipe $a^3$ and the other with the fixed supply-pipe $a^4$, each pair of hollow semispheres constituting a hinge through which water can flow, this hinged pipe-joint being too well known to all skilled in the art to need description.

Movable waste-pipe $a^2$ and movable supply-pipe $a^5$ are hollow to conduct the water to and from the bowl, pipe $a^2$ extending horizontally from the rearmost part of the bowl when it is ready for use and vertically from the lowermost part of the bowl when turned back.

The parts of the drawings not described are the ordinary parts of a car, a recess being provided for the bowl, which is shown turned back in dotted lines in Fig. 1.

In using my apparatus the bowl is lowered and water is supplied through fixed supply-pipe $a^4$ and hollow movable supply-pipe $a^5$, and when the bowl is turned back it is completely drained through hollow movable waste-pipe $a^2$ and fixed waste-pipe $a^3$, the bowl then occupying the recess above described.

What I claim as my invention is—

In a lavatory apparatus the combination of a bowl; hollow hinged rods attached to and supporting the bowl; a fixed supply-pipe leading to one of the hinged rods; and a fixed waste-pipe leading from the other hinged rod, which rod projects horizontally from the rearmost part of the bowl when the bowl is ready for use and vertically from the lowermost part of the bowl when turned back.

THOMAS O. POTTER.

Witnesses:
G. A. ROCKWELL,
C. B. MAYNADIER.